(12) United States Patent
Ikeda et al.

(10) Patent No.: US 10,291,100 B2
(45) Date of Patent: May 14, 2019

(54) ENGINE SYSTEM

(71) Applicant: YANMAR CO., LTD., Osaka-shi (JP)

(72) Inventors: Tomoyuki Ikeda, Osaka (JP); Satoshi Abe, Osaka (JP); Yosuke Tahara, Osaka (JP)

(73) Assignee: YANMAR CO., LTD., Osaka (JP)

( * ) Notice: Subject to any disclaimer, the term of this patent is extended or adjusted under 35 U.S.C. 154(b) by 46 days.

(21) Appl. No.: 14/809,401

(22) Filed: Jul. 27, 2015

(65) Prior Publication Data
US 2016/0043611 A1 Feb. 11, 2016

(30) Foreign Application Priority Data

Aug. 5, 2014 (JP) ................................. 2014-159293

(51) Int. Cl.
| | |
|---|---|
| H02K 5/20 | (2006.01) |
| H02K 9/00 | (2006.01) |
| F02B 63/04 | (2006.01) |
| H02K 9/04 | (2006.01) |
| H02K 7/18 | (2006.01) |

(52) U.S. Cl.
CPC ............. H02K 9/00 (2013.01); F02B 63/044 (2013.01); H02K 7/1815 (2013.01); H02K 9/04 (2013.01); *Y02E 20/14* (2013.01)

(58) Field of Classification Search
CPC . F01P 11/10; F21B 27/02; F02B 29/04; F02B 29/046; H02K 5/20; H02K 7/1815; H02K 9/00; H02K 9/04; H02K 2209/00
See application file for complete search history.

(56) References Cited

U.S. PATENT DOCUMENTS

| | | | | |
|---|---|---|---|---|
| 4,951,871 A | * | 8/1990 | Hata | F01P 3/20 |
| | | | | 237/12.1 |
| 8,360,014 B2 | * | 1/2013 | Ono | F01P 3/202 |
| | | | | 123/2 |
| 8,963,348 B2 | * | 2/2015 | Kawakita | F02B 63/044 |
| | | | | 123/2 |
| 2011/0000407 A1 | * | 1/2011 | Bassett | F01K 7/36 |
| | | | | 110/238 |
| 2011/0057454 A1 | * | 3/2011 | Kawakita | F02B 63/04 |
| | | | | 290/1 A |

FOREIGN PATENT DOCUMENTS

JP 5134428 B2 1/2013

* cited by examiner

*Primary Examiner* — Lindsay M Low
*Assistant Examiner* — Omar Morales
(74) *Attorney, Agent, or Firm* — Norton Rose Fulbright US LLP

(57) ABSTRACT

A package has its internal space divided into a top compartment and a bottom compartment. The bottom compartment contains the engine. The top compartment is further divided by a partition wall into a first top compartment (e.g., a radiator chamber) and a second top compartment (e.g., a device installation chamber). The partition wall has a spatial connection port. The second top compartment has an external wall panel (e.g., the rear, upper panel) located facing the spatial connection port, the external wall panel having a vent (e.g., a gallery) formed therethrough. There is provided a duct-shaped heatsink to deliver outside air introduced through the vent to the spatial connection port. Electric components, such as an inverter, are disposed directly on an external surface of the heatsink (on the top face).

20 Claims, 6 Drawing Sheets

ENGINE SYSTEM

CROSS REFERENCE TO RELATED APPLICATIONS

This application is related to co-pending application: "ENGINE SYSTEM" filed even date herewith in the names of Tomoyuki Ikeda, Satoshi Abe, and Yosuke Tahara, which claims priority to Japanese Application No. 2014-159294, filed Aug. 5, 2014; "ENGINE SYSTEM" filed even date herewith in the names of Susumu Murai, Akihiro Nagao and Hiroyuki Okada, which claims priority to Japanese Application No. 2014-159295, filed Aug. 5, 2014; and "ENGINE SYSTEM" filed even date herewith in the names of Susumu Murai, Akihiro Nagao and Hiroyuki Okada, which claims priority to Japanese Application No. 2014-159296, filed Aug. 5, 2014; which applications are assigned to the assignee of the present application and all three incorporated by reference herein.

CROSS-REFERENCE TO RELATED APPLICATION (FOR U.S. APPLICATION ONLY)

The present application hereby claims priority under 35 U.S.C. § 119 on Japanese Patent Application, Tokugan, No. 2014-159293 filed Aug. 5, 2014 in Japan, the entire contents of which are hereby incorporated herein by reference.

BACKGROUND OF INVENTION

Technical Field of Invention

The present invention relates in general to engine electric power generators and other like engine systems containing an engine and electric components in a single package and in particular to cooling structures for the electric components.

Related Technology

Some conventional engine systems, such as cogeneration devices, have the internal space of their package divided into a top compartment and a bottom compartment. The bottom compartment accommodates an engine chamber, and the top compartment accommodates a radiator chamber. As an example, in the package described in Patent Document 1 (Japanese Patent No. 5134428), the bottom compartment is divided into an engine chamber and a device installation chamber that contains a control box, an inverter, and other electric components.

A ventilation duct is disposed horizontally on the floor of the device installation chamber. One of the ends of the ventilation duct is spatially connected to a vent through which outside air is introduced. The other end of the ventilation duct is spatially connected to an air intake fan that is disposed in the partition wall that separates the device installation chamber from the engine chamber. This air intake fan for the engine chamber introduces outside air into the engine chamber via the ventilation duct. The ventilation duct has on its ceiling wall an inverter housing to enhance heat discharge by means of ventilation air flowing in the ventilation duct.

Another air intake fan is disposed on a side face of the inverter housing to introduce outside air. The air intake fan introduces outside air also into the inverter housing. The outside air thus introduced moves through the inverter housing and an exhaust path and merges with the ventilation air in the ventilation duct before being discharged outside the package.

SUMMARY OF INVENTION

The structure of this conventional example does not provide good dust resistance because the outside air introduced by the air intake fan moves through the inverter housing, exposing the electric parts of the inverter in the housing to outside air.

Accordingly, the present invention has an object of improving the dust resistance of the electric components of, for example, an inverter in an engine system while ensuring the coolability of the electric components.

The present invention, conceived to achieve the object, is an engine system containing an engine and electric components in a single package. The package has an internal space thereof divided into a top compartment and a bottom compartment. The bottom compartment contains the engine. The top compartment is further divided by a partition wall into a first top compartment and a second top compartment. The first top compartment contains a radiator and a radiator fan.

The partition wall has a spatial connection port that spatially connects the first top compartment and the second top compartment. The second top compartment has an external wall panel located facing the spatial connection port. The external wall panel has a vent formed therethrough. There is provided a duct-shaped heatsink to deliver outside air introduced through the vent to the spatial connection port. The electric components are disposed directly on an external surface of the heatsink.

In the engine system in accordance with the present invention, as the temperature in the package rises due to the operation of, for example, the engine, the radiator fan in the first top compartment rotates, discharging heated air out of the package. The second top compartment in which temperature rises due to the operation of electric components includes therein a duct-shaped heatsink through which outside air flows to the first top compartment. This outside air flow enhances the cooling of the electric components.

In other words, the heatsink extends from the vent in the external wall panel of the second top compartment to the spatial connection port in the partition wall that separates the second top compartment from the first top compartment. The first top compartment where pressure decreases due to the operation of the radiator fan draws air from the channels inside the heatsink that are spatially continuous with the first top compartment. This structure enables the outside air flowing in through the vent in the external wall panel to pass through the channels inside the heatsink.

The electric components are disposed directly on an external surface of the heatsink. This structure effectively enhances heat discharge from the electric parts of the electric components, ensuring the coolability of the electric components. In addition, since the outside air flows through the channels inside the heatsink, the electric parts are not exposed to the outside air as in the aforementioned conventional example, achieving high dust resistance.

Preferably, the heatsink is disposed a distance above a floor surface of the second top compartment, and the engine is provided with an air intake tube having an opening below the heatsink. This particular structure enables the heatsink to also cool the intake air for the engine, which increases air intake efficiency. In addition, if the outside air flowing in the heatsink is partially guided to the air intake tube, that part of the outside air may be used as the air to be combusted in the engine.

DESCRIPTION OF EMBODIMENTS

The following will describe embodiments of the present invention in reference to drawings.

The present embodiment is an application of an energy system in accordance with the present invention to a cogeneration device 1. The cogeneration device 1 is a system that connects both an external commercial power supply from a commercial electric power system and an electric power supply from an electric power generator (via an inverter 54) to an electric power supply system for an electric power consuming device (load), to meet the demand for electric power by the load and that also recovers waste heat generated in power generation for later use.

Figure 1:
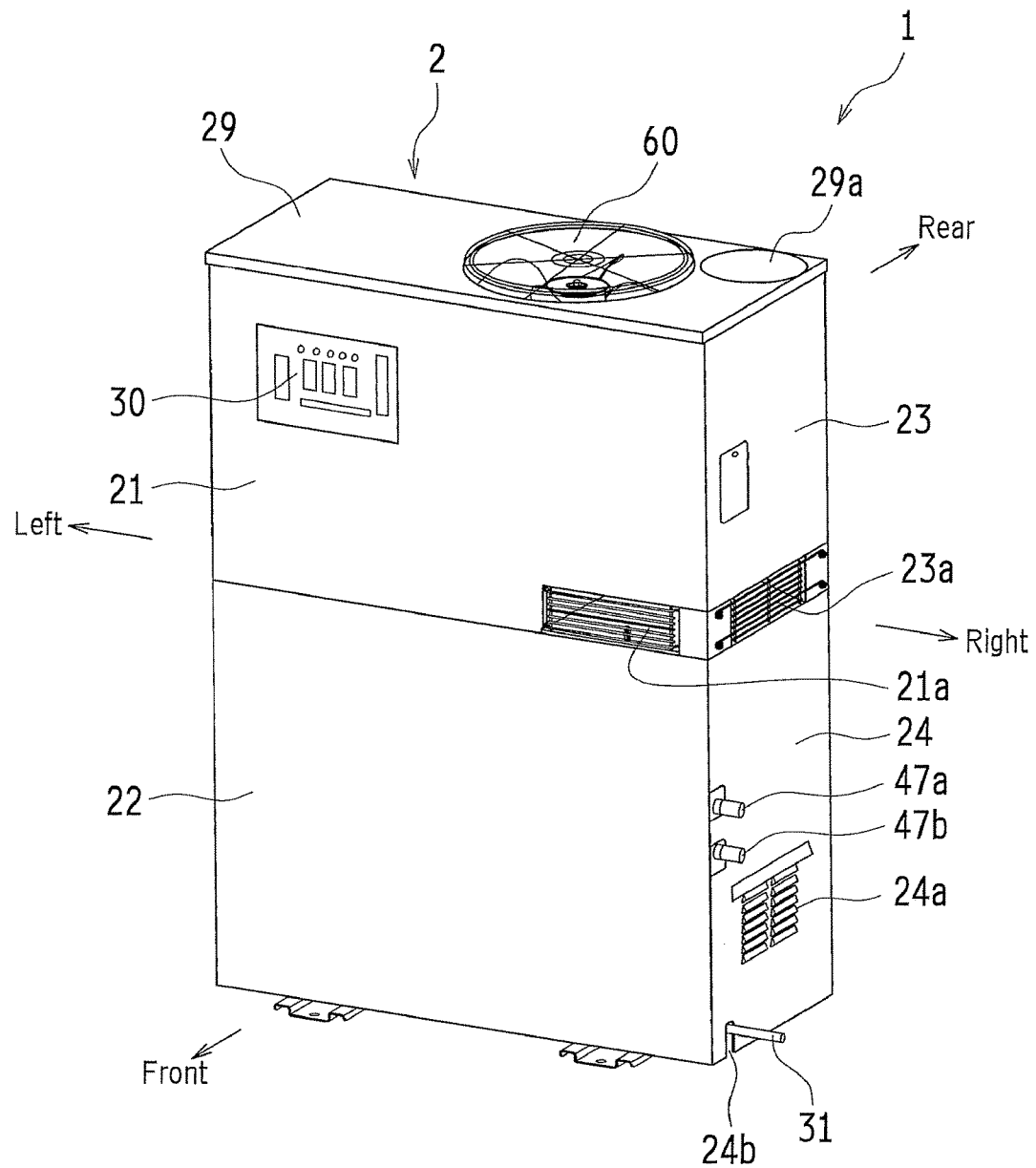
FIG. 1 is an oblique view of a cogeneration device in accordance with an embodiment of the present invention as viewed from the front.
Figure 2:
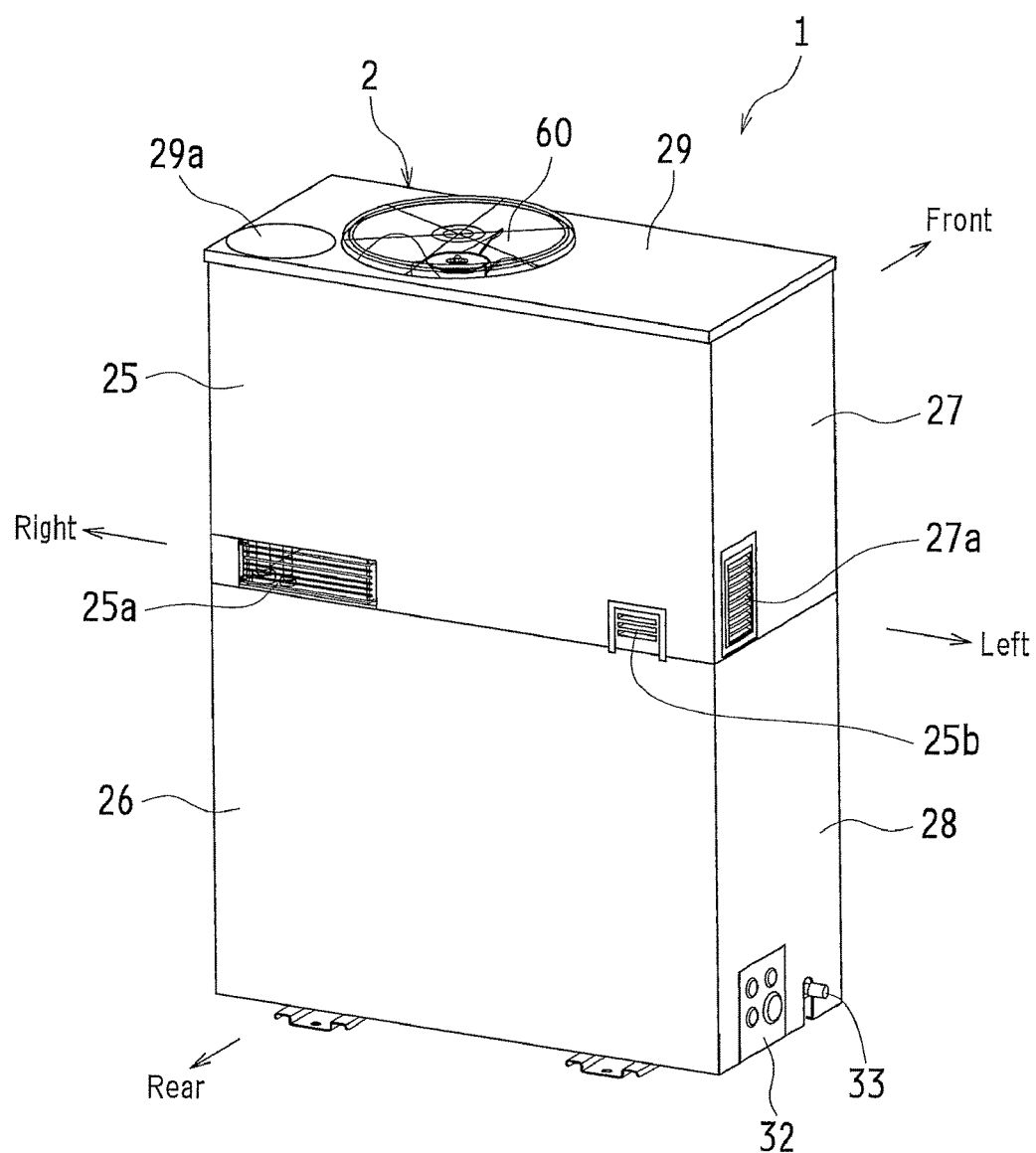
FIG. 2 is an oblique view of the cogeneration device shown in FIG. 1 as viewed from the rear.

FIGS. 1 and 2 are oblique views of the cogeneration device 1 as viewed from the front and rear respectively. As shown in FIGS. 1 and 2, the cogeneration device 1 in accordance with the present embodiment includes a package 2 as an enclosure shaped substantially like a vertically elongated rectangular parallelepiped. The package 2, in this example, has a greater dimension in the left/right direction (width) than in the front/rear direction (depth). Throughout the rest of the description, the left-hand side in FIG. 1 will be simply referred to as the left-hand side, and the right-hand side in FIG. 1 will likewise be simply referred to as the right-hand side.

More specifically, the package 2 in accordance with the present embodiment includes a frame 20 (see FIG. 3) and a plurality of panels 21 to 29. The frame 20 is composed of a steel-based material and has a rectangular base 8 (see FIG. 3) as a base component. The panels 21 to 29 are fixed to the frame 20 in such a manner that the panels 21 to 29 are individually detachable. In other words, as shown in FIG. 1, the front face of the package 2 is divided into two (i.e., upper and lower) panels 21 and 22. The right face of the package 2 is also divided into two (i.e., upper and lower) panels 23 and 24.

Likewise, as shown in FIG. 2, the rear face of the package 2 is also divided into two (i.e., upper and lower) panels 25 and 26. The left face of the package 2 is also divided into two (i.e., upper and lower) panels 27 and 28. Meanwhile, the top face of the package 2 is a single-piece top face panel 29 in which there are provided, for example, a radiator fan 60 and an engine exhaust port 29a (detailed later).

A control panel 30 is provided near the upper left corner of the upper panel 21 on the package's front face. A radiator vent 21a is provided in a right bottom part of the upper panel 21. Another radiator vent 23a is provided in a bottom part of the upper panel 23 on the package's right face. An engine ventilation gallery 24a is provided in a lower part of the lower panel 24 on the package's right face. A notch section 24b is cut out on the bottom end of the lower panel 24, close to the front. A drain hose 31 is run through the notch section 24b.

Near the right bottom corner of the upper panel 25 on the package's rear face, opposite the radiator vent 21a in the upper panel 21 on the package's front face, is there provided a like radiator vent 25a. Near the left bottom corner of the upper panel 25 is there provided an engine air intake gallery 25b. A gallery (vent) 27a is provided in a bottom part of the upper panel 27 on the package's left face, close to the rear, to introduce an inverter-cooling air flow. A power supply connector 32 and a gas supply tap 33 are provided in a bottom part of the lower panel 28 on the package's left face.

Figure 3:
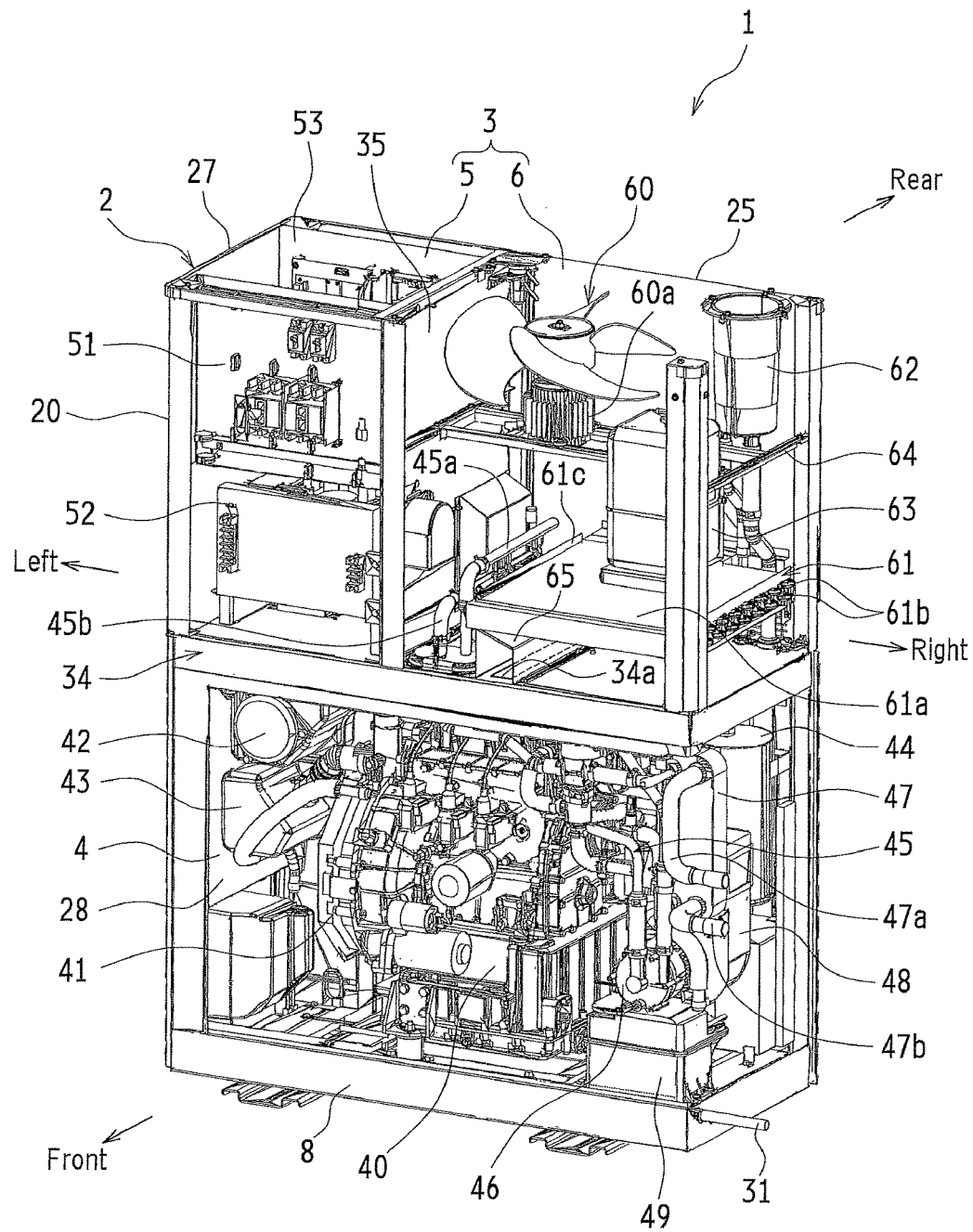
FIG. 3 is an oblique view of the cogeneration device shown in FIG. 1, illustrating the structure of the cogeneration device by removing parts of its package.

As illustrated in FIG. 3 by partially omitting the panels 21 to 29, the frame 20, and some other structural members, the internal space of the package 2 is divided into two upper and lower portions by a midlevel wall 34 located substantially halfway up from the bottom. The upper portion contains a top compartment 3, whereas the lower portion contains a bottom compartment 4. The top compartment 3 is divided by a partition wall 35 into left and right portions. The left portion contains a device installation chamber 5 (second top compartment), whereas the right portion contains a radiator chamber (first top compartment) 6.

An engine 40 and an electric power generator 41 that is powered by the engine 40 are disposed substantially at the center of the bottom compartment 4. In the left-hand side of the bottom compartment 4 are there provided an air cleaner 42, an intake air silencer 43, and other air intake system components for the engine 40. Meanwhile, an exhaust system is disposed on the rear of the engine 40. An exhaust silencer 44, connected to an exhaust manifold (not shown), is disposed in the right-hand side of the bottom compartment 4, close to the rear. As an example, the engine 40 may be a gas engine.

A cooling water circuit 45 is disposed in the right-hand side of the bottom compartment 4, close to the front, so as to cool the engine 40 during operation and recover waste heat. The cooling water circuit 45 connects a water jacket of the engine 40 to a radiator 61 (detailed later) to circulate cooling water by a cooling water pump 46 and recover exhaust heat by an exhaust gas heat exchanger (not shown).

The waste heat thus recovered may be reused by a water/water heat exchanger 47 as a heat source for a water heater or like system that is out of the view. The water/water heat exchanger 47 is connected to the cooling water circuit 45. More specifically, a water supply tube 47a and a waste water tube 47b, both connected to the water/water heat exchanger 47, extend through the lower panel 24 on the package's right face and project out of the package 2 as illustrated in FIG. 1, so that piping from, for example, a water heater can be connected to the water supply tube 47a and the waste water tube 47b.

An air intake fan 48 is disposed so as to be interposed between the cooling water circuit 45 and the exhaust silencer 44, to draw outside air into the bottom compartment 4 for ventilation. The air intake fan 48 operates in synchronism with the cooling water pump 46. The air intake fan 48 draws outside air through the gallery 24a in the lower panel 24 on the package's right face and through an air intake duct (not shown) and blows out the air at the bottom of the bottom compartment 4.

A drain water filter 49 is disposed in the right-hand side of the bottom compartment 4, close to its front lower part, below the cooling water circuit 45 and the cooling water pump 46. The drain water filter 49 recovers condensed water separated out of the exhaust of the engine 40 in a mist separator 62 (detailed later) and neutralizes its acidic content by calcite. The neutralized drain water is discharged from the package through the drain hose 31.

While the lower portion of the package 2 contains the bottom compartment 4 alone as mentioned above, the top compartment 3, located above the midlevel wall 34, is divided into the device installation chamber 5 and the radiator chamber 6 as mentioned above. The left one of the chambers, or the device installation chamber 5, contains electric components to control the engine 40 and the electric power generator 41. Circuit boards 51 to 53 shown, for example, in FIG. 3 carry thereon a control circuit for the engine 40, a control circuit for an electromagnetic valve and other components of the cooling water circuit 45, and a control circuit for, among others, the cooling water pump 46, the radiator fan 60, and the air intake fan 48 respectively.

Figure 4:
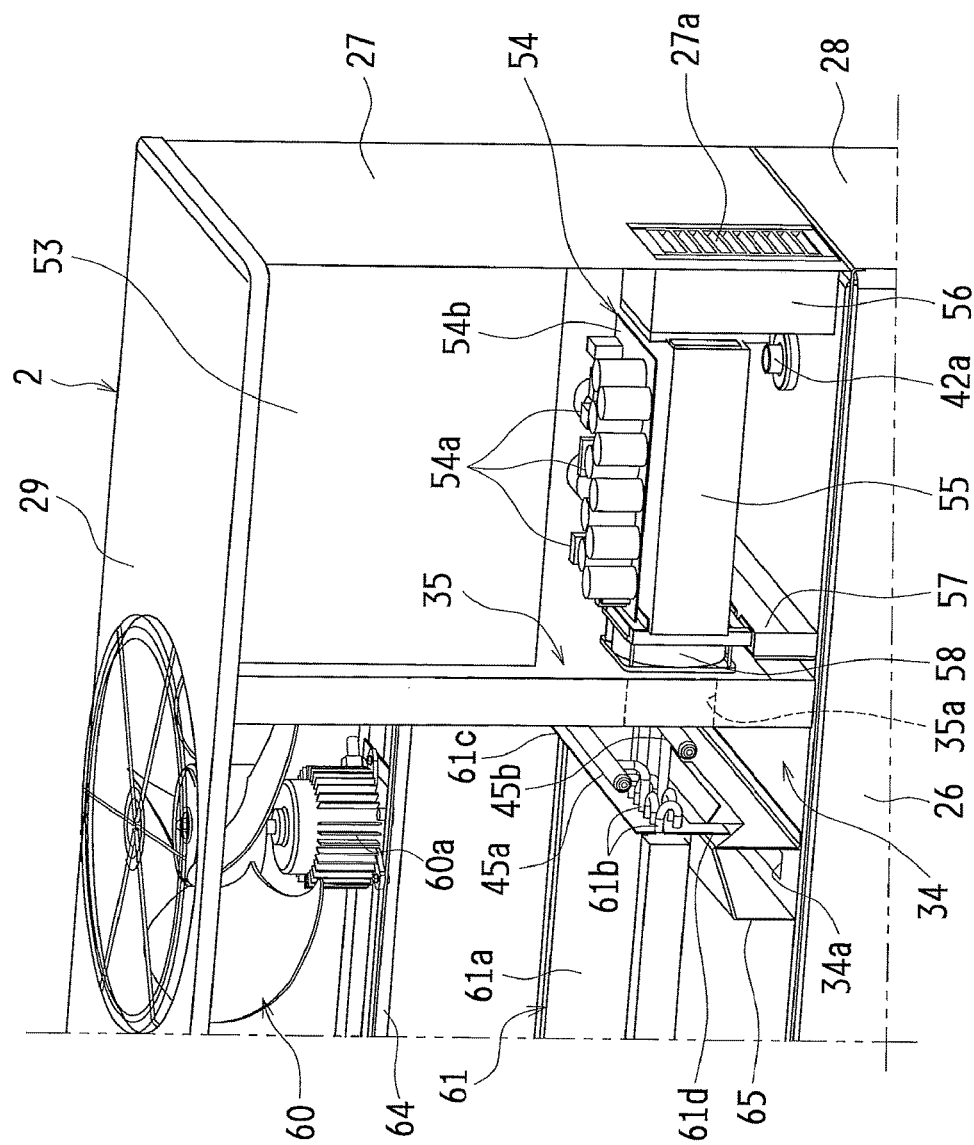
FIG. 4 is an oblique view of a device installation chamber (especially, an inverter and its cooling structure) as viewed from the rear of the package.

As illustrated in FIG. 4 showing a view from the rear of the package 2, the inverter 54 is also disposed in a lower part of the device installation chamber 5 close to the rear. The inverter 54 converts the frequency of the voltage and current generated by the electric power generator 41. In this example, the inverter 54 includes a circuit board 54b carrying thereon power transistors (e.g., IGBTs), capacitors, reactors, and other electric parts 54a. The circuit board 54b is attached directly to the top face of the heatsink 55.

In FIG. 4, the upper panels 25 and 27 on the rear and left faces of the package 2 and the frame 20 are partially not shown, to make the inverter 54 and the heatsink 55 visible. The cooling structure of the inverter 54, built around the heatsink 55, will be described later in detail.

Referring to FIG. 3, the radiator chamber 6, located to the right of the device installation chamber 5, contains the radiator fan 60 in its top portion, i.e., through the top face panel 29 of the package 2. The radiator 61, being rectangular in a plan view, is disposed laterally (in this example, substantially horizontally) facing the radiator fan 60 from below. The radiator fan 60 is located a little off the center (to the left) of the radiator chamber 6. To the right of the radiator fan 60 are there provided the mist separator 62 and a cooling water reserve tank 63. The mist separator 62 separates water content out of the exhaust of the engine 40.

The radiator fan 60 has a main body portion 60a containing an electric motor. The main body portion 60a is supported by the frame 20 of the package 2 via a subframe 64 so that the radiator fan 60 has its rotating shaft oriented vertically. The radiator 61, disposed to face the radiator fan 60 from below, is located off the center (to the right) of the radiator chamber 6, so that the middle portion of the core 61a of the radiator 61 is displaced to the right with respect to the rotating shaft line of the radiator fan 60.

A water supply pipe 45a and a waste water pipe 45b, which are components of the cooling water circuit 45, are disposed to the left of the radiator 61 located in the right-hand side of the radiator chamber 6 and are connected to respective tubes 61b of the radiator 61 as shown also in FIG. 4. Each tube 61b is folded over in the left/right direction inside the core 61a of the radiator 61 and has an end thereof connected to the water supply pipe 45a and the other end thereof connected to the waste water pipe 45b.

Heated cooling water flows into the tubes 61b via the water supply pipe 45a, and while passing through the tubes 61b in the core 61a of the radiator 61, exchanges heat with the air passing vertically through the core 61a (radiator ventilation air) to discharge heat. The cooling water, now cooled down as a result of the heat discharge, flows out of the tubes 61b into the waste water pipe 45b and returns to the water jacket of the engine 40 through the cooling water circuit 45.

The radiator 61 is separated from the underlying midlevel wall 34 by as much as the height of the radiator vents 21a, 23a, and 25a opened respectively in the front, right, and rear faces of the package 2, in order to allow the passage of the radiator ventilation air. This structure introduces outside air via the three radiator vents 21a, 23a, and 25a into an outside air introducing space formed below the radiator 61 and subsequently passes the outside air through the core 61a upward from below.

To support the radiator 61 above the midlevel wall 34 at a distance equal to the height of the radiator vents 21a, 23a, and 25a in this manner, the radiator 61 has a right frame portion thereof supported at its two front and rear corners by the frame 20 of the package 2. Meanwhile, the left frame portion 61c of the radiator 61 is supported by a spatial connection port cover 65 that covers a spatial connection port 34a in the midlevel wall 34 from above.

More specifically, the spatial connection port 34a is opened substantially through the central portion of the midlevel wall 34 with respect to the left/right direction (in this example, a little to the right of the central portion), so that the opening is formed vertically through the midlevel wall 34, spatially connecting the bottom compartment 4 to the radiator chamber 6. The spatial connection port cover 65 is disposed so as to cover the spatial connection port 34a from above. The spatial connection port cover 65 is open to the space that is to the left of the radiator chamber 6. The spatial connection port cover 65 restrains the ingress of rain water into the spatial connection port 34a and also guides the engine ventilation air that flows in from the bottom compartment 4 through the spatial connection port 34a to the space that is to the left of the radiator chamber 6.

The left frame portion 61c of the radiator 61 is attached to, and supported by, the spatial connection port cover 65. Specifically, referring to FIG. 4 showing the radiator 61 and the spatial connection port cover 65 from the rear side, the left frame portion 61c of the radiator 61 has support nails 61d respectively at the front and rear ends thereof. The support nails 61d extend downward and are placed and fixed to the top of the sidewall of the spatial connection port cover 65.

Cooling Structure of Inverter

Next, the cooling structure of the inverter 54 in accordance with the present embodiment will be described in reference to FIG. 5, as well as to FIG. 4. The heatsink 55, in this example, is tubular (shaped like a duct), has a rectangular cross-section, and is disposed so as to extend in the left/right direction at a predetermined distance above the midlevel wall 34 of the package 2. The heatsink 55 has its left end ("right" end in FIGS. 4 and 5) connected to, and supported by, a dust trap 56. Meanwhile, the heatsink 55 has its right end ("left" end in FIGS. 4 and 5) supported by a bracket 57 on the midlevel wall 34.

Figure 5:
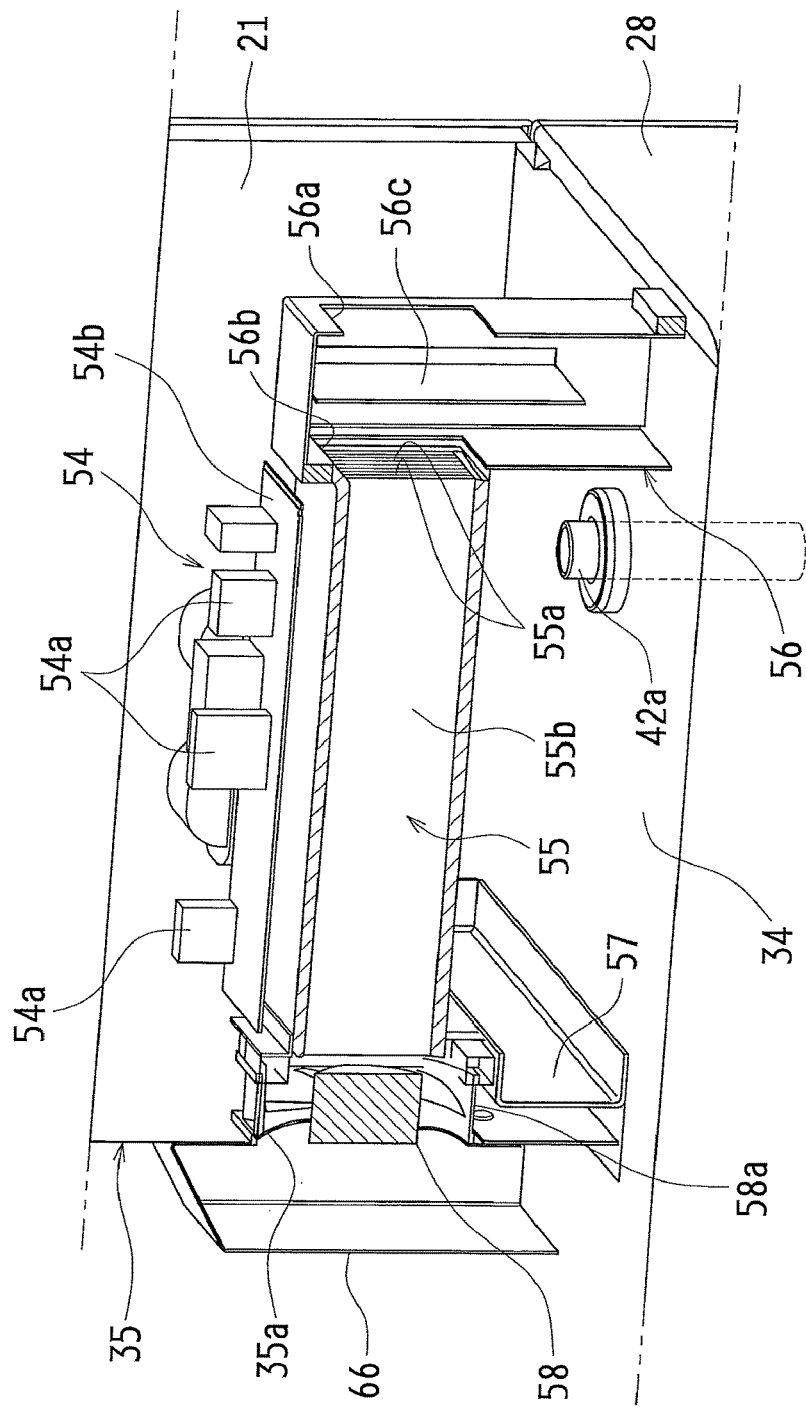
FIG. 5 is an oblique view of a heatsink and related devices shown in FIG. 4, illustrating the devices in cross-sections.

Referring to FIG. 5, a large number of fins 55a that extend parallel to the length of the heatsink 55 are provided in the heatsink 55 at predetermined intervals as measured parallel to the width in the cross-section of the passage (parallel to the front/rear direction of the package 2). Between these fins 55a are there formed a large number of narrow channels 55b. Through the left end ("right" end in FIG. 5) of the heatsink 55, outside air flows into the channels 55b from the gallery (vent) 27a in the upper panel 27 on the package's left face (external wall panel of the second top compartment) via the dust trap 56.

More specifically, referring to FIG. 5, the dust trap 56 has an inlet 56a and an outlet 56b opened in an upper portion thereof. The inlet 56a is spatially continuous with the gallery 27a, and the outlet 56b is spatially continuous with the channels 55b inside the heatsink 55. The dust trap 56 has a labyrinth structure in which the air passage from the inlet 56a to the outlet 56b is vertically folded over by the presence of an middle wall 56c. The labyrinth structure enables the dust trap 56 to separate rain water and dust out of the incoming outside air.

Meanwhile, through the right end ("left" end in FIG. 5) of the heatsink 55, the channels 55b are connected to an air intake fan 58 provided in the partition wall 35 to cool the inverter 54. The air channel enclosed by a shroud 58a of the air intake fan 58 (reference numeral is only indicated in FIG. 5) spatially connects the channels 55b inside the heatsink 55 to a spatial connection port 35a opened in the partition wall 35. In this example, a cover 66 is provided on the partition wall 35 in the radiator chamber 6. The cover 66 covers the spatial connection port 35a and has an open bottom.

In other words, the duct-shaped heatsink 55 is provided in the following manner: the gallery 27a through which outside air is introduced and the spatial connection port 35a that leads to the radiator chamber 6 are provided respectively in the upper panel 27 on the package's left face (external wall panel of the device installation chamber 5) and in the partition wall 35 located opposite the upper panel 27 so that the outside air introduced through the gallery 27a is passed to the spatial connection port 35a.

As the air intake fan 58 facing the spatial connection port 35a rotates, air is drawn into the radiator chamber 6 out of the channels 55b inside the heatsink 55. Therefore, outside air flows into the channels 55b inside the heatsink 55 through the gallery 27a and the dust trap 56, subsequently moving further toward the air intake fan 58 (as indicated by arrows in FIG. 6).

The circuit board 54b of the inverter 54 is disposed directly on the top face of the heatsink 55 through which outside air passes through the channels 55b. In this example, the capacitors, reactors, and other electric parts 54a are disposed on the top face of the circuit board 54b, whereas the power transistors (electric parts, not shown) are disposed on the bottom face of the circuit board 54b so that the power transistors are in contact with the top face of the heatsink 55.

Heat is thus transferred from the electric parts 54a (especially, power transistors) of the inverter 54 directly to the heatsink 55. This structure sufficiently enhances heat discharge of the electric parts 54a. The heatsink 55 is designed with a suitable heat capacity so that it can sufficiently absorb the heat generated by the electric parts 54a, diffuse the heat through the large number of fins 55a, and discharge the heat into the outside air flowing in the channels 55b.

In this example, the large number of fins 55a are provided to divide the internal space of the heatsink 55 into the numerous channels 55b. This structure increases the contact area between the channels 55b and the air flowing therein and also produces suitable resistance that prevents excessively fast air flows. The structure thus enables the heat discharged by the electric parts 54a of the inverter 54 to be effectively exchanged with air in the heatsink 55, ensuring coolability.

The engine 40 has an air intake tube 42a with an opening located below the heatsink 55. The air intake tube 42a extends upward from the air cleaner 42 (see FIG. 3) disposed in the bottom compartment 4 of the package 2, running through and projecting upward from the midlevel wall 34. Outside air flows in through the engine air intake gallery 25b (see FIG. 2) provided on the upper panel 25 on the package's rear face and is drawn into the air intake tube 42a.

Alternatively, an opening may be provided, for example, in a lower part of the heatsink 55 so that the outside air flowing in the internal channels 55b can be partially guided into the air intake tube 42a.

The cogeneration device 1 in accordance with the present embodiment is configured as described in the foregoing. The following description will focus on an air flow that cools the inverter 54 while the device 1 is in operation, that is, an inverter-cooling air flow through the channels 55b inside the heatsink 55.

In the cogeneration device 1 in accordance with the present embodiment, ambient temperature in the bottom compartment 4 rises due to the operation of the engine 40, the electric power generator 41, etc. In response to this temperature rise, the air intake fan 48 operates to draw outside air through the gallery 24a in the lower panel 24 on the package's right face and then through the air intake duct (not shown). The air blown by the air intake fan 48 (engine ventilation air) ascends while drawing heat from the engine 40, the electric power generator 41, etc. in the bottom compartment 4 and flows through the spatial connection port 34a in the midlevel wall 34 into the overlying radiator chamber 6.

The heated cooling water flowing out of the water jacket of the engine 40 is delivered to the radiator 61 where the cooling water discharges heat, which elevates ambient temperature in the radiator chamber 6. That in turn causes the radiator fan 60 to rotate. Hence, the air below the radiator fan 60, or the air in an upper portion of the radiator chamber 6, is discharged to the space above the package 2, generating negative pressure in the radiator chamber 6. The negative pressure increases the flow rate of the air moving upward through the radiator 61 (quantity of ventilation air).

The electric voltage and current generated by the electric power generator 41 that is in turn powered by the engine 40 is stepped up or frequency-converted by the inverter 54 in the device installation chamber 5, which causes the power transistors and other electric parts 54a to discharge an increased quantity of heat. This issue is addressed in the present embodiment by passing outside air through the internal space of the duct-shaped heatsink 55 in the device installation chamber 5 to cool the inverter 54.

Figure 6:
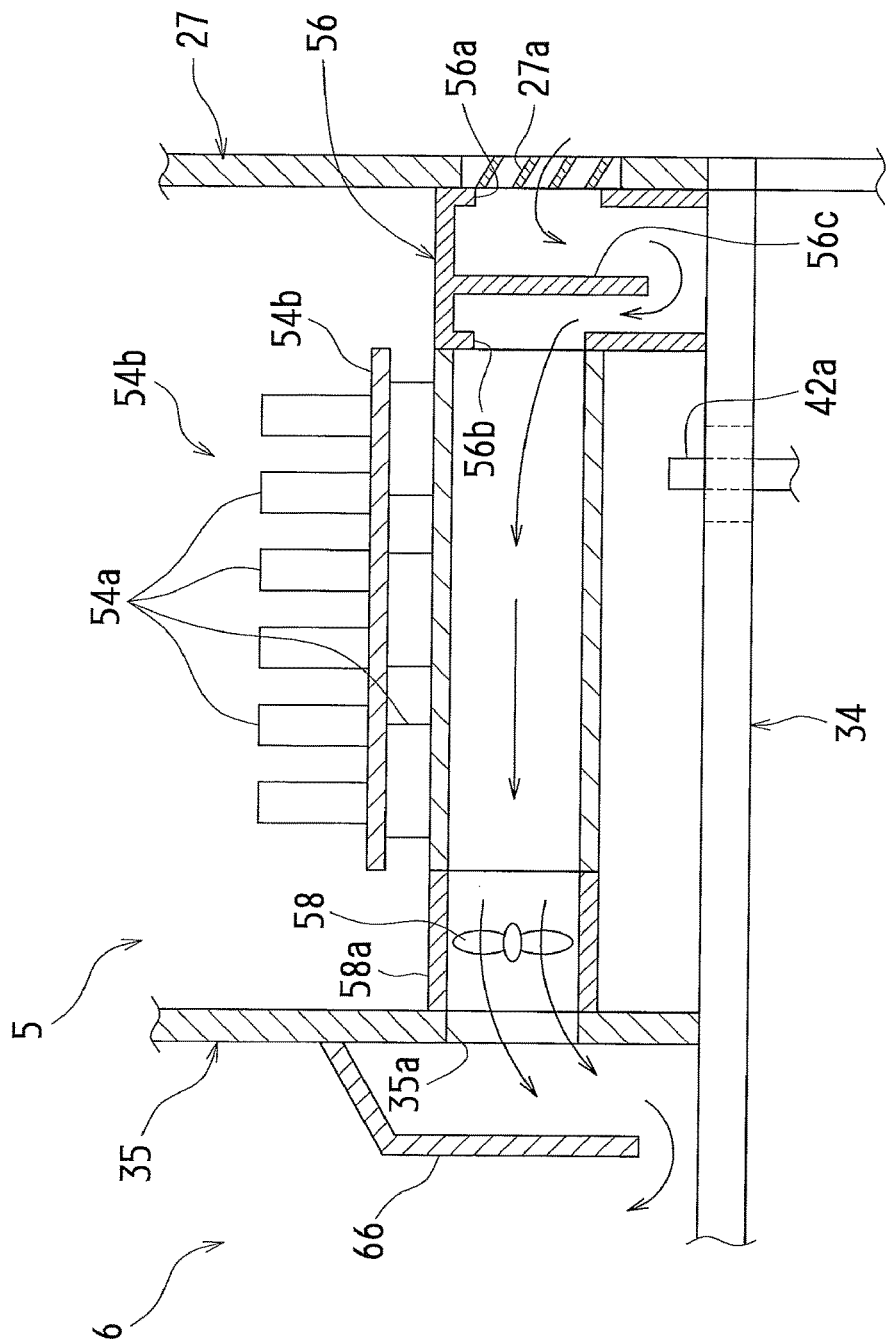
FIG. 6 is a schematic diagram primarily depicting an air flow (inverter-cooling air flow) inside the heatsink.

In other words, as shown schematically in FIG. 6, the air intake fan 58 rotates at the right end (left end in FIG. 6) of the heatsink 55 to deliver air from the channels 55b inside the heatsink 55 through the spatial connection port 35a to the radiator chamber 6. Hence, at the left end (right end in FIG. 6) of the heatsink 55, outside air flows from the gallery 27a into the channels 55b inside the heatsink 55 through the dust trap 56, flowing toward the air intake fan 58.

Because the operation of the radiator fan 60 is generating negative pressure in the radiator chamber 6, hence an upward ventilation air flow, as mentioned above, air is likely to flow through the spatial connection port 35a into a lower section of the radiator chamber 6. Hence, a sufficient flow rate (quantity of cooling air) is achieved even if the channels 55b inside the heatsink 55 have relatively high resistance.

Therefore, the cogeneration device 1 in accordance with the present embodiment effectively enhances heat discharge from the power transistors and other electric parts 54a in the inverter 54 because, as described above, the inverter 55 is disposed directly on the top face of the duct-shaped heatsink 55 through which outside air flows in sufficient quantities as cooling air. That ensures coolability of the inverter 54 and other electric components.

The cooling air that cools the inverter 54 via the heatsink 55 flows only through the channels 55b inside the heatsink 55. The electric parts 54a of the inverter 54 disposed on the top face of the heatsink 55 are therefore not exposed to the outside air, achieving high dust resistance.

Furthermore, in the present embodiment, the heatsink 55 is disposed a distance above the midlevel wall 34 in the device installation chamber 5. Below the heatsink 55 is provided the air intake tube 42a of the engine 40, to also cool the air to be combusted in the engine 40. This structure increases the air intake efficiency of the engine 40.

The present invention is by no means limited to the embodiment described above. For example, the inverter 54, in the embodiment, is disposed on the top face of the heatsink 55. This is by no means intended to be limiting the invention. Alternatively, the inverter 54 may be disposed on a side or a bottom face of the heatsink 55. The heatsink 55 is not necessarily disposed a distance above the midlevel wall 34 and may be disposed on the top face of the midlevel wall 34.

The bottom compartment 4 of the package 2, in the embodiment, may be further divided to provide, for example, an intake air/exhaust chamber and a device installation chamber in addition to the engine chamber.

The present invention may be applied to a GHP (gas heat pump) that includes a compressor in a refrigerating circuit as a work machine powered by an engine.

The present invention is by no means limited to the embodiments described above and may be implemented in various other forms. Therefore, the embodiments are for illustrative purposes only in every respect and should not be subjected to any restrictive interpretations. The scope of the present invention is defined only by the claims and never bound by the specification. Those modifications and variations that may lead to equivalents of claimed elements are all included within the scope of the invention.

The invention claimed is:

1. An engine system containing an engine and electric components in a single package,
    the package having an internal space thereof divided into a top compartment and a bottom compartment,
    the bottom compartment containing the engine,
    the top compartment being further divided by a partition wall into a first top compartment and a second top compartment,
    the first top compartment containing a radiator and a radiator fan,
    the partition wall having a spatial connection port, disposed therein and extending therethrough, that spatially connects the first top compartment and the second top compartment,
    the second top compartment having an external wall panel located facing the spatial connection port, the external wall panel having a vent formed therethrough,
    a duct-shaped heatsink disposed within the second top compartment and extending between the spatial connection port and the external wall panel to deliver outside air introduced through the vent to the spatial connection port completing an air path from the vent to the first top compartment and the radiator fan, and
    the electric components being disposed directly on, and extending away from, an external surface of the heatsink in a direction away from the air path.

2. The engine system as set forth in claim 1, wherein
    the heatsink is disposed a distance above a floor surface of the second top compartment, and the engine is provided with an air intake tube having an opening below the heatsink.

3. An engine system comprising:
    a single package comprising a plurality of external wall panels that define an internal space, the internal space divided into a top compartment and a bottom compartment;
    a partition wall positioned in the top compartment and including a spatial connection port therein, the partition wall configured to define the top compartment into a first top compartment and a second top compartment, the plurality of external wall panels including an external wall panel of the second top compartment and having a vent formed therethrough;
    an engine positioned within the bottom compartment;
    a radiator and a radiator fan positioned within the first top compartment;
    a heatsink duct disposed within the second top compartment, the heatsink duct having an inlet coupled to and in fluid communication with the vent and an outlet coupled to and in fluid communication with the spatial connection port; and
    electric components positioned in the second top compartment and disposed on the heatsink duct.

4. The engine system of claim 3, wherein an air flow path includes the vent, a through channel of the heatsink duct, the spatial connection port, and the radiator fan.

5. The engine system of claim 4, wherein the air flow path is independent of the bottom compartment.

6. The engine system of claim 4, wherein the heatsink duct is configured to enable outside air introduced through the vent to be communicated through the spatial connection port to the first top compartment and the radiator fan.

7. The engine system of claim 3, wherein the electric components are disposed directly on an external surface of the heatsink duct.

8. The engine system of claim 3, wherein the heatsink duct is configured to dissipate heat generate by the electric components.

9. The engine system of claim 3, further comprising:
    a midlevel wall positioned within the internal space and configured to divided the internal space into the top compartment and the bottom compartment.

10. The engine system of claim 9, wherein the heatsink duct is disposed a distance above the midlevel wall.

11. The engine system of claim 9, further comprising:
    an air intake tube associated with the engine, the air intake tube extending from the bottom compartment, through the midlevel wall, and into the second top compartment, wherein an opening of the air intake tube in the second top compartment is positioned below the heatsink duct.

12. The engine system of claim 9, wherein:
    the heatsink duct comprises a plurality of vertically positioned fins that extend between the inlet and the outlet.

13. The engine system of claim 12, further comprising:
    a fan disposed within the second top compartment and positioned between the spatial connection port and the heatsink duct.

14. The engine system of claim 13, further comprising:
    a cover disposed within the first top compartment and coupled to the partition wall, the cover configured to direct air from the spatial connection port toward a portion of the midlevel wall associated with the first top compartment.

15. The engine system of claim 14, further comprising:
    a dust trap disposed within the second top compartment and coupled to the external wall panel and the heatsink duct, the dust trap comprising an inlet in fluid communication with the vent and an outlet in fluid communication with the inlet of the heatsink duct.

16. An engine system comprising:
a single package comprising a plurality of external wall panels that define an internal space, the internal space divided into a top compartment and a bottom compartment;
a partition wall positioned in the top compartment and including a spatial connection port therein, the partition wall configured to define the top compartment into a first top compartment and a second top compartment, the plurality of external wall panels including an external wall panel of the second top compartment and including a vent;
an engine positioned within the bottom compartment;
a radiator and a radiator fan positioned within the first top compartment;
electric components positioned in the second top compartment; and
an enclosed channel that extends through the second top compartment and defines an air flow path from the vent to the spatial connection port, the enclosed channel comprising a duct, the duct comprises a plurality of fins configured to operate as a heatsink for the electric components.

17. The engine system of claim 16, wherein the enclosed channel extends between the external wall panel and the partition wall.

18. The engine system of claim 17, wherein the duct comprises an inlet coupled to and in fluid communication with the vent and an outlet coupled to and in fluid communication with the spatial connection port.

19. The engine system of claim 18, wherein the enclosed channel further comprises:
a midlevel wall positioned within the internal space and configured to divided the internal space into the top compartment and the bottom compartment;
a dust trap coupled to the external wall panel and the duct, the dust trap comprising an inlet in fluid communication with the vent and an outlet in fluid communication with the inlet of the duct;
a fan positioned between the spatial connection port and the duct; and
a cover disposed within the first top compartment and coupled to the partition wall, the cover configured to direct air from the spatial connection port toward a portion of the midlevel wall associated with the first top compartment.

20. The engine system of claim 19, wherein:
the air flow path, through the enclosed channel, from the vent to the spatial connection port is configured to provide outside air introduced through the vent to the first top compartment independent of the bottom compartment; and
the external wall panel is positioned opposite the partition wall.

* * * * *